US010744509B2

United States Patent
Smeets et al.

(10) Patent No.: US 10,744,509 B2
(45) Date of Patent: Aug. 18, 2020

(54) TOOL

(71) Applicants: Betek GmbH & Co. KG, Aichhalden (DE); AHWI Maschinenbau GmbH, Herdwangen-Schoenach (DE)

(72) Inventors: Florian Smeets, Dossenheim (DE); Ulrich Kraemer, Wolfach (DE)

(73) Assignees: Betek GmbH & Co. KG (DE); AHWI Maschinenbau GmbH (DE)

( * ) Notice: Subject to any disclaimer, the term of this patent is extended or adjusted under 35 U.S.C. 154(b) by 639 days.

(21) Appl. No.: 15/426,189

(22) Filed: Feb. 7, 2017

(65) Prior Publication Data
US 2017/0239668 A1  Aug. 24, 2017

(30) Foreign Application Priority Data
Feb. 23, 2016  (DE) .................. 20 2016 100 953 U

(51) Int. Cl.
| B02C 18/18 | (2006.01) |
| A01G 23/06 | (2006.01) |
| A01G 23/00 | (2006.01) |
| A01B 33/10 | (2006.01) |

(52) U.S. Cl.
CPC .............. B02C 18/18 (2013.01); A01G 23/00 (2013.01); A01G 23/067 (2013.01); A01B 33/10 (2013.01); Y02A 40/294 (2018.01)

(58) Field of Classification Search
CPC ....... A01B 33/10; A01G 23/067; A01G 23/06
USPC ...................... 241/282.2; 407/114
See application file for complete search history.

(56) References Cited

U.S. PATENT DOCUMENTS

| 4,998,574 A | * | 3/1991 | Beach ................. A01G 23/067 144/231 |
| 5,810,519 A | * | 9/1998 | Vogel ...................... B23C 5/109 407/114 |
| 6,394,375 B1 | * | 5/2002 | Balvanz ............. B02C 13/2804 241/197 |
| 7,938,350 B2 | * | 5/2011 | Doppstadt .............. B02C 18/18 241/294 |
| 8,231,072 B2 | * | 7/2012 | Willibald .............. A01B 33/08 241/294 |
| 9,943,037 B2 | * | 4/2018 | Stanley ................ A01B 33/142 |
| 2002/0017580 A1 | | 2/2002 | Ragnarsson |
| 2004/0071515 A1 | * | 4/2004 | Arvidsson .............. B23C 5/109 407/113 |
| 2007/0194161 A1 | | 8/2007 | Doppstadt et al. |
| 2008/0283150 A1 | * | 11/2008 | Essig .................. A01G 23/067 144/241 |

(Continued)

FOREIGN PATENT DOCUMENTS

| DE | 202005009859 U1 | 1/2006 |
| DE | 202005010337 U1 | 2/2006 |

(Continued)

*Primary Examiner* — Sean M Michalski
(74) *Attorney, Agent, or Firm* — Lucian Wayne Beavers; Patterson Intellectual Property Law, PC

(57) ABSTRACT

A cutter holder has two limbs extending at an angle to each other. A cutter is mounted on one side of the cutter holder. An opposite side of the cutter holder has a prism-shaped cavity defined thereon. The cavity has a V-shape cross-section having a recessed groove at a base of the V-shape. A center line of the recessed groove is laterally offset from a center line of the cutter holder.

10 Claims, 4 Drawing Sheets

(56) References Cited

U.S. PATENT DOCUMENTS

| | | | |
|---|---|---|---|
| 2009/0114751 A1* | 5/2009 | Doppstadt | B02C 13/28 241/197 |
| 2010/0163662 A1* | 7/2010 | Andersson | B23P 15/40 241/282.2 |
| 2012/0024425 A1* | 2/2012 | Leonardi | A01G 23/067 144/241 |
| 2012/0032013 A1* | 2/2012 | Rice | B02C 18/145 241/282.2 |
| 2013/0126651 A1* | 5/2013 | Carson, Jr. | A01G 23/067 241/285.1 |
| 2015/0037106 A1* | 2/2015 | Kovac | B23C 5/207 407/33 |
| 2015/0083275 A1* | 3/2015 | Paumier | B27B 33/20 144/24.12 |
| 2015/0136276 A1* | 5/2015 | Green | A01G 23/067 144/24.12 |
| 2015/0173310 A1* | 6/2015 | Willibald | B02C 18/145 241/277 |
| 2015/0336187 A1* | 11/2015 | Choi | B23C 5/06 407/48 |
| 2018/0258618 A1* | 9/2018 | Kraemer | A01B 33/10 |
| 2018/0290149 A1* | 10/2018 | Ver Steeg | B02C 18/184 |

FOREIGN PATENT DOCUMENTS

| | | |
|---|---|---|
| DE | 102006032295 A1 | 1/2008 |
| WO | 2013174496 A1 | 11/2013 |

\* cited by examiner

TOOL

BACKGROUND OF THE INVENTION

1. Field of the Invention

The innovation relates to a tool for processing plant or mineral materials, in particular in the sphere of agricultural forestry or in road or tunnel building.

The tool has at least one cutter made of a hard material, which can be arranged on a cutter holder, wherein the cutter holder is formed from two limbs directed at an angle to each other and, on the surface opposite the cutter, has a prism-shaped cavity for accommodating a machine holder.

2. Description of the Prior Art

WO 2013/174496 A1 (US 20150173310) discloses a cutting device for comminuting wood or soil by means of a comminuting rotor, comprising at least one cutter holder, wherein the cutter holder has a groove with a longitudinal center line for partially accommodating a base element of a comminuting rotor. The groove is bounded by at least two partial surface regions which are at an angle to each other, wherein the longitudinal center line is divided because of a recess into at least two partial sections at an angle to each other.

The base element is matched to the partial sections oriented at an angle to each other and to the partial surface regions directed at an angle to each other and is surrounded in the cutter holder by the groove.

A disadvantage of this tool combination is that, because of the production of the base element and of the cutter holder as forged parts, the latter can be produced in the customary manner only with large dimensional tolerances.

As a result, only an inadequate form-fitting connection can be achieved between the cutter holder and the base element.

SUMMARY OF THE INVENTION

It is the object of the innovation to provide a cutter holder of the type mentioned at the beginning, which forms an improved fit between a cutter holder and a base element.

The object of the innovation is achieved in that the base of the prism-shaped cavity has a cavity contour following the profile of the prism in the longitudinal direction.

A first substantial advantage of this cavity contour according to the innovation is the improved form-fitting connection between the cutter holder and the machine holder. By this means, the carrying portion of the cutter holder in the machine holder of tools known from the prior art can be additionally increased in the tool according to the innovation from a carrying portion of approximately 40% to a carrying portion of 70%.

A further advantage of the cavity contour is the formation of spring-elastic properties of the two lateral limbs directed at an angle to each other, as the result of which the cutter holder can be clamped on the machine holder.

BRIEF DESCRIPTION OF THE DRAWINGS

The innovation is explained in more detail below with reference to an exemplary embodiment which is illustrated in the drawings, in which.

DETAILED DESCRIPTION

Figure 1:
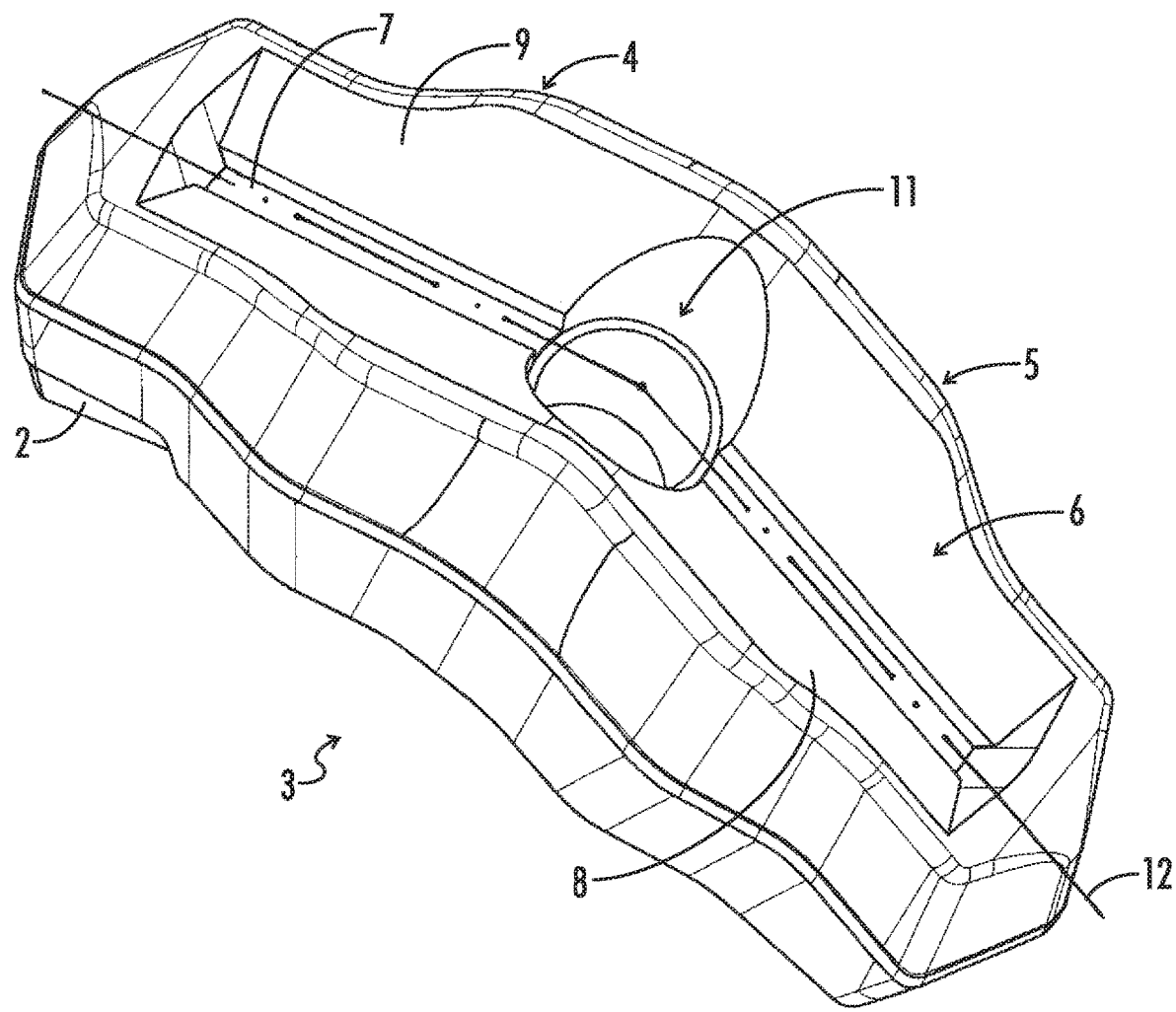
FIG. 1 shows the illustration of a cutter holder according to the innovation with a prism-shaped cavity in a perspective top view.

FIG. 1 shows a tool according to the innovation as a cutter holder 3, which is formed from two limbs 4, 5, in a perspective top view. FIG. 1 shown here illustrates that surface of the cutter holder 2 which has a prism-shaped cavity 6 which extends along a body center line 12 within the body of the cutter holder 3. The body center line 12 may also be referred to as a limb center line 12. The two limbs 4, 5 are directed at an angle to each other which, in FIG. 1 illustrated here, comprises an angle of approximately 110°. Said angle can be adapted in accordance with the working task to be carried out, the present machine parameters and to the material to be processed, wherein, at an angle of 180°, the cavity 6 in the cutter holder 3 forms a flat profile.

Owing to the prism shape of the cavity 6, the latter forms two contact surfaces 8, 9 which lie opposite each other at an angle and form a shape and position of similarity with the contact surfaces of an engaged machine holder.

In order to improve a position of stability of the cutter holder 3 when the latter is in engagement with the machine holder, the base of the cavity 6 has a cavity contour 7 with the same directional profile. The cavity contour 7 may also be referred to as a recessed groove 7. The center line 14 running along the cavity contour 7 has a lateral offset 15 with respect to the body center line 12 of the cutter holder 3, said offset forming a sufficient limb length of one of the two limbs 4, 5 which are formed. Said offset avoids a superimposition of stress forces occurring because of the prestressing of the receiving profile in the body center of the cutter holder 3. A premature stress rupture or stress cracks in the cutter holder 3 can therefore be avoided. The cavity contour 7 can have differently shaped cross sectional areas, depending on the method for producing the cavity contour 7 (milling—forging—etc.). The center line 14 may also be referred to as a recessed groove center line 14.

On that surface of the cutter holder 3 which lies opposite the cavity 6, a cutter 2 which has a hard material composite material or a carbide composite material with polycrystalline diamond (PCD) is arranged in at least one end region of the cutter holder 3.

The cutter 2 is preferably connected to the surface of the cutter holder 3 with a cohesive material joint. The surface on which the cutter 2 is mounted may be referred to as a first side or cutter support side of cutter holder 3. The opposite side of cutter holder 3 where the cavity 6 is formed may be referred to as a second side or mounting side of cutter holder 3.

In a further embodiment (not illustrated here) of a cutter holder 3, the arrangement of at least two cutters 2 arranged lying opposite each other on a surface can be realized, wherein the still free surface on the side of the cutters 2 can additionally be protected against wear with further wear protection elements.

The cutter holder 3 additionally has at least one recess 11 for accommodating at least one fastening means, wherein the recess 11 runs preferably as a center perpendicular to the cavity 6. The recess can also be arranged at any other position of the cavity 6 and in every spatial position. The center position of the recess 11 in the cutter holder 3 appropriately forms the latter symmetrically. As a result, the service life of a cutter holder 3 can be substantially increased under the same working conditions.

A perspective view of a cutter holder 3 according to FIG. 1 is shown from below in FIG. 2, wherein the same reference numbers refer here to identical components.

Figure 2:
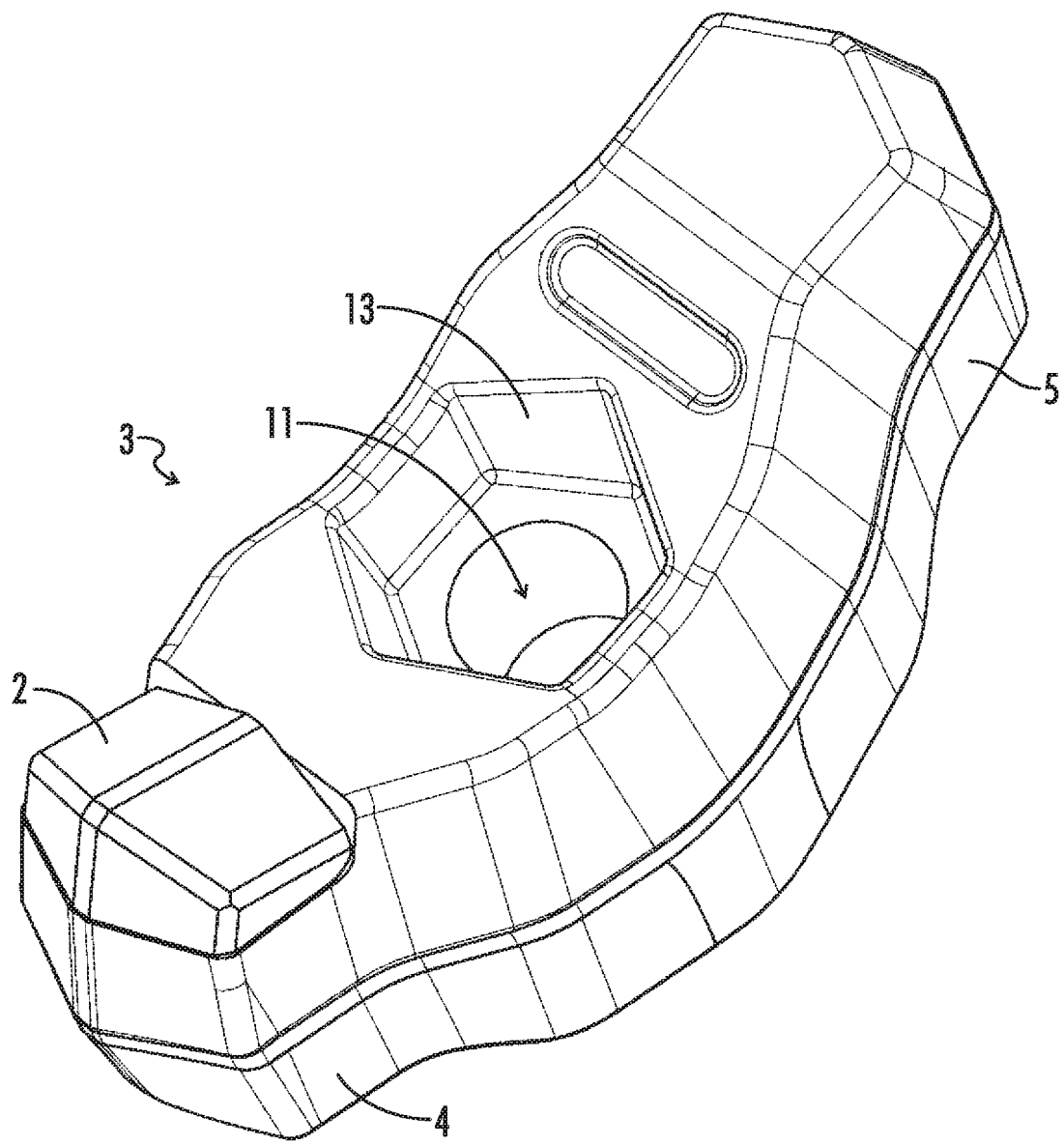
FIG. 2 shows the illustration according to FIG. 1 in a perspective view from below.

In contrast to FIG. 1, FIG. 2 shows a hexagonal recess 13 on the surface of the cutter holder 3, said hexagonal recess being designed for accommodating a hexagonal head of a fastening means. As a result, the cutter holder 3 can be fastened in a fixed position, wherein the recessed head of the fastening means is protected against excessive wear during the operation of the tool.

Figure 3:
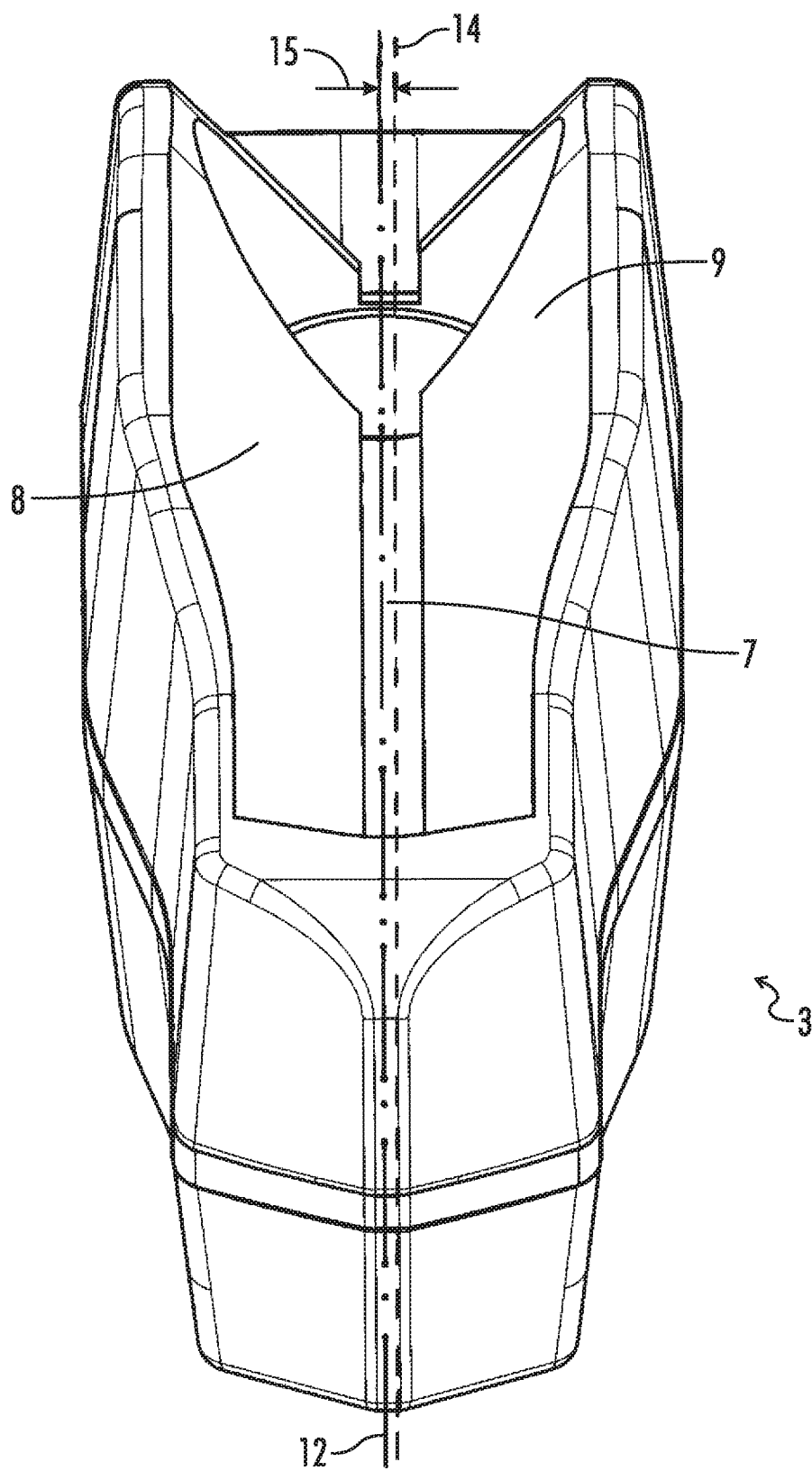
FIG. 3 shows the perspective illustration of a cutter holder with cavity and cavity contour.

FIG. 3 shows a perspective illustration of a tool according to the innovation according to FIGS. 1 and 2, wherein it is apparent here that the center line 14 of the cavity contour 7 has a lateral offset 15 with respect to the body center line 12 of the cutter holder 3.

Figure 4:
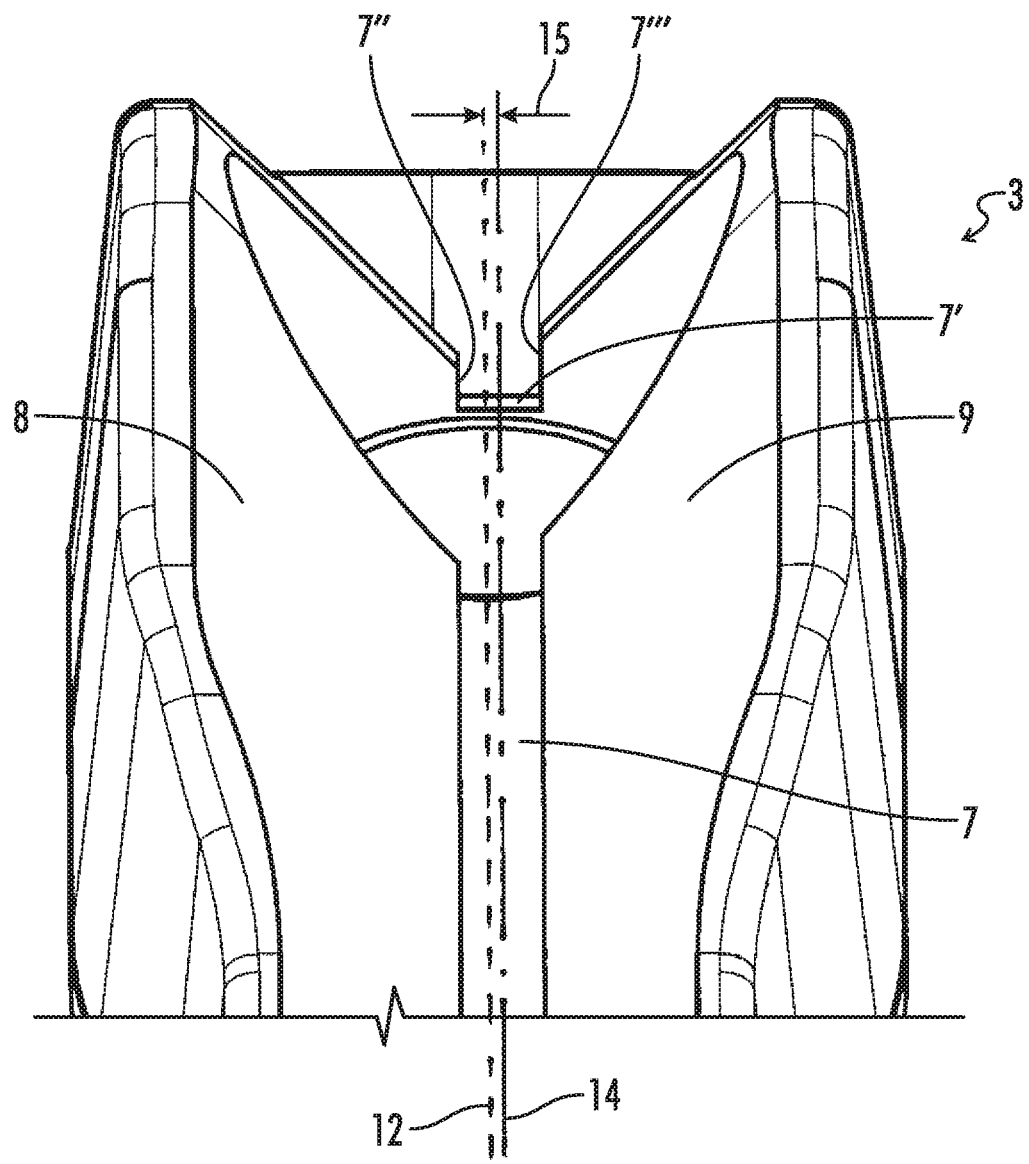
FIG. 4 shows an enlarged illustration of the perspective view of the cavity with the cavity contour according to FIG. 3.

FIG. 4 is an enlarged perspective illustration according to FIG. 3, wherein the lateral offset 15 of the center line 14 of the cavity contour 7 with respect to the body center line 12 of the cutter holder 3 is shown clearly here. By means of the offset of the center line 14 of the cavity contour 7 with respect to the body center line 12 of the cutter holder 3, supporting surfaces 8, 9 of differing cross-sectional length are formed, said supporting surfaces substantially improving the stable form-fitting connection between a cutter holder 3 and a machine holder in engagement therewith.

The cavity contour or recessed groove 7 of FIG. 4 can be described as having a groove base 7' joined to the contact surfaces 8 and 9 by two groove walls 7" and 7'''. The groove wall 7" adjacent the contact surface 8 of greater cross-sectional length is shorter than the groove wall 7''' adjacent the contact surface 9 of lesser cross-sectional length.

In a further embodiment (not described specifically here) of a cutter holder 3, the cavity contour 7 arranged in the base of the cavity 6 provides a separate arrangement in alternating manner of what are referred to as partial cavity contours in the cutter holder 3 at different positions of the cavity 6. This embodiment can additionally reduce the stress forces occurring in the cutter holder 3.

What is claimed is:

1. A cutting tool apparatus for processing plant or mineral materials, comprising:
    a cutter holder having two limbs extending away from each other at an angle along respective limb lengths;
    at least one cutter mounted on a first side of at least one of the limbs, the cutter being made of a hard material harder than the cutter holder; and
    wherein the cutter holder has a prism-shaped cavity formed therein on a second side of the limbs opposite the at least one cutter, the prism-shaped cavity having a cross-section having a V-shape defined by two contact surfaces, with a base of the V-shape having a recessed groove defined in each limb, each recessed groove following the length of its respective limb, and each recessed groove intersecting the two contact surfaces and separating the two contact surfaces and being recessed from the two contact surfaces toward the first side;
    each limb has a limb center line parallel to its limb length and lying within the recessed groove; and
    each recessed groove of the prism-shaped cavity has a recessed groove center line offset from the limb center line of its respective limb.

2. The apparatus of claim 1, wherein:
    the angle formed between the limbs of the cutter holder is between 90 degrees and 180 degrees.

3. The apparatus of claim 1, wherein:
    the cutter holder includes a fastener recess extending through the cutter holder from the first side to the second side for receiving a fastener, the fastener recess extending through the prism-shaped cavity.

4. The apparatus of claim 1, wherein:
    the hard material of the cutter comprises a composite material selected from the group consisting of a carbide composite, a carbide composite with polycrystalline diamond (PCD) and a combination thereof.

5. A cutting tool apparatus, comprising:
    a cutter holder having first and second limbs extending away from each other at an obtuse angle, the limbs defining a cutter support side within the obtuse angle and a mounting side opposite from the cutter support side;
    at least one cutter attached to the cutter support side; and
    wherein the first and second limbs have a mounting cavity defined in the mounting side of the cutter holder;
    wherein the mounting cavity has a cross-sectional shape perpendicular to a length of each limb, the cross-sectional shape being defined by two contact surfaces separated by a groove intersecting the two contact surfaces and recessed from the two contact surfaces toward the cutter support side, the two contact surfaces tapered toward each other and toward the recessed groove; and
    wherein the recessed groove has first and second groove base portions extending along the first and second limbs, respectively, the first and second groove base portions defining the obtuse angle between the first and second limbs; and
    wherein the recessed groove is laterally offset toward one of the two contact surfaces so that one of the two contact surfaces has a cross-sectional length greater than the other of the two contact surfaces.

6. The apparatus of claim 5, wherein:
    the recessed groove of the cross-sectional shape of the mounting cavity has a groove base joined to the two contact surfaces by two groove walls, and the groove wall adjacent the contact surface of greater cross-sectional length is shorter than the groove wall adjacent the other contact surface.

7. The apparatus of claim 5, wherein:
    the recessed groove of the cross-sectional shape of the mounting cavity has a groove base joined to the two contact surfaces by two groove walls.

8. The apparatus of claim 5, wherein:
    the cutter holder includes a fastener recess extending through the cutter holder from the cutter support side to the mounting side for receiving a fastener, the fastener recess extending through the mounting cavity.

9. The apparatus of claim 5, wherein:
    the cutter is made of a hard material harder than the cutter holder.

10. The apparatus of claim 9, wherein:
    the hard material of the cutter comprises a composite material selected from the group consisting of a carbide composite, a carbide composite with polycrystalline diamond (PCD) and a combination thereof.

\* \* \* \* \*